United States Patent [19]

Holt

[11] 4,158,798

[45] Jun. 19, 1979

[54] CONTROL CIRCUITS FOR WINDSCREEN WIPERS FOR ROAD VEHICLES

[75] Inventor: William D. Holt, Colne, England

[73] Assignee: Lucas Industries Limited, Birmingham, England

[21] Appl. No.: 813,703

[22] Filed: Jul. 7, 1977

[30] Foreign Application Priority Data

Jul. 8, 1976 [GB] United Kingdom ............... 28418/76

[51] Int. Cl.² .......................... H02P 1/04; B60S 1/08
[52] U.S. Cl. ................................ 318/444; 15/250.12; 15/250.13
[58] Field of Search ................. 318/443, 444, DIG. 2; 15/250.02, 250.12, 250.13

[56] References Cited

U.S. PATENT DOCUMENTS

| | | | |
|---|---|---|---|
| 3,487,282 | 12/1969 | Gasiorek et al. | 318/443 |
| 3,656,042 | 4/1972 | Keisuke | 15/250.02 |
| 3,657,626 | 4/1972 | Royure et al. | 15/250.02 |

Primary Examiner—David Smith, Jr.
Attorney, Agent, or Firm—John C. Holman; Marvin R. Stern

[57] ABSTRACT

In order to be able to use a standard windscreen wiper switch with a biased open contact for selecting flick wipe or intermittent wipe operation the control circuit includes a flip-flop which is set when the contact is closed, but is reset by a timing circuit if the contact is held closed for more than a predetermined time. The output of the flip-flop controls a timer i.c. which in turn intermittently energizes the wiper system while the flip-flop remains set.

5 Claims, 1 Drawing Figure

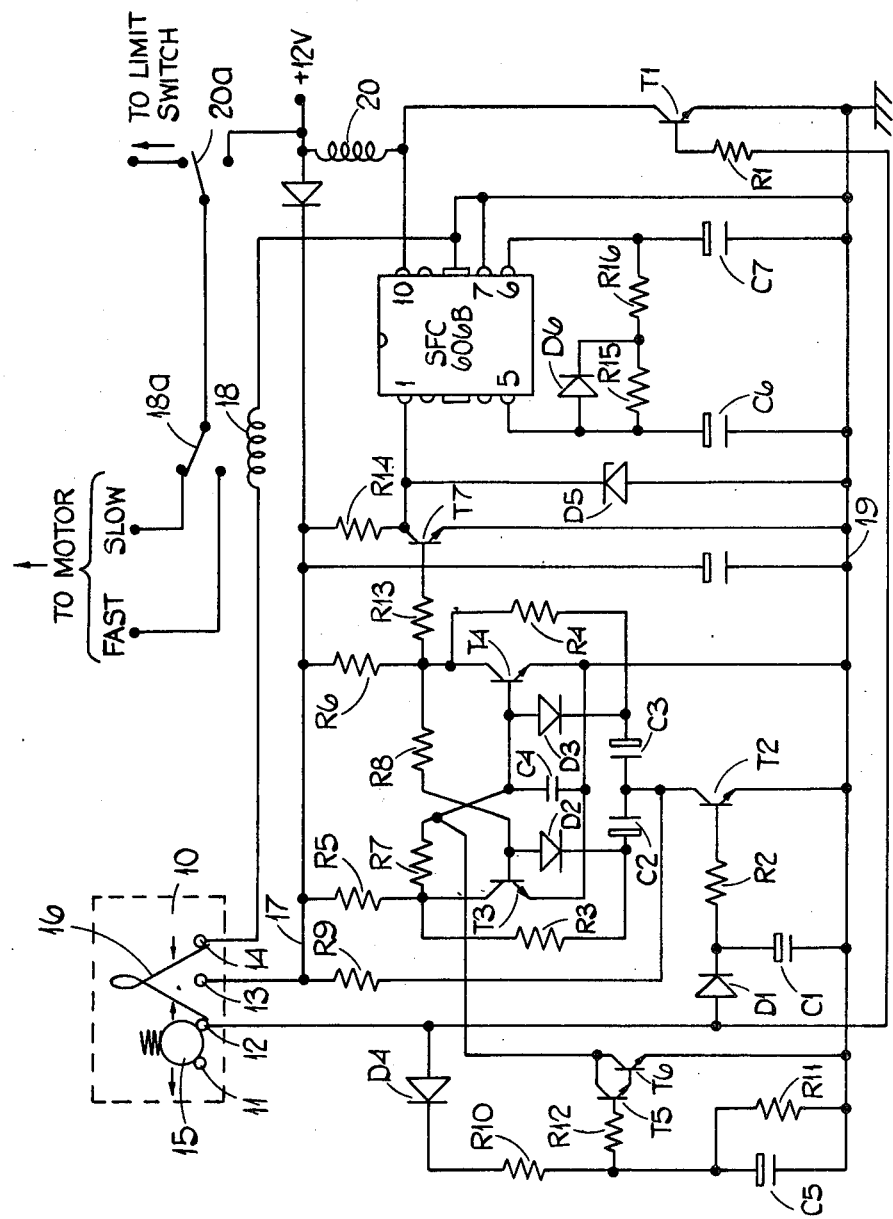

CONTROL CIRCUITS FOR WINDSCREEN WIPERS FOR ROAD VEHICLES

This invention relates to control circuits for windscreen wipers for road vehicles.

It is already known to employ a control circuit using switches and relays to provide normal screen wiper operation and so called flick-wipe operation in which momentary closure of a contact of the control switch causes the wipers to carry out a single wipe cycle and then stop. For such an arrangement the control switch has one or more on positions in which it is held by detent means for normal operation and a further on position for which there is no detent means.

It is also known to provide a windscreen wiper arrangement with a control circuit for intermittent operation, i.e. where the wipers operate for a single cycle and then pause before another single cycle.

It is an object of the present invention to provide a windscreen wiper control circuit in which intermittent operation and flick-wipe operation can be obtained from a simple control switch with provision for flick-wipe.

A windscreen wiper control circuit in accordance with the invention comprises a control switch assembly including main contacts associated with detent means for selecting normal operation and a further contact without detent means for selecting flick-wipe or intermittent operation, a pulse length recognition circuit operable by the further contact and arranged to cause the wipers to operate in the flick-wipe mode or the intermittent mode according to the length of time for which the further contacts are closed.

Preferably the arrangement is such that a longer closure of the further contacts is required to obtain flick-wipe mode than that required to obtain intermittent mode.

The control circuit conveniently includes an intermittent wipe timer which is energised only when intermittent wipe mode has been selected.

The pulse length recognition means may include a bistable circuit and a timer circuit, initial closure of said further contacts operating to change the state of the bistable circuit and the timer circuit operating to reset the bistable circuit after a predetermined interval if the additional contacts are still closed. When intermittent wipe has been selected by a closure of the further contacts for a duration shorter than said predetermined interval, a second short closure of the contacts will reset the bistable circuit.

An example of the invention is shown in the accompanying drawing which is an electrical circuit diagram of the control circuit.

In the drawing, there is shown a control switch 10 of known type having four terminals 11, 12, 13 and 14, a spring-loaded bridging contact 15 the spring loading of which causes it to remain in any of the three positions in which it bridges the terminals and a spring wire contact 16 which can only bridge the terminals 12 and 13. The contact 15 is movable in either direction between three distinct detent positions.

Terminal 13 of the switch 10 is connected to a 12 V supply rail 17. Terminal 14 is connected through a relay coil 18 to an earth 19 and controlling a changeover contact 18a to determine whether power is applied to a fast or slow running brush of the windscreen wiper motor. The contact 18a is connected via a contact 20a of a relay 20 either to the 12 V supply or to a limit switch incorporated in the mechanism and providing a separate connection to the 12 V rail when the wipers are out of their parked position and a path to earth when they are in their parked position.

The terminal 12 of the switch 10 provides for slow running, a flick-wipe mode operation and intermittent mode operation. To this end the terminal 12 is connected by a resistor $R_1$ to the base of an n-p-n transistor $T_1$ which has its emitter connected to the rail 19 and the relay winding 20 connected between the rail 17 and its collector.

The terminal 12 is also connected to the anode of a diode $D_1$, the cathode of which is connected to the base of a transistor $T_2$ via a resistor $R_2$, a capacitor $C_1$ being connected between the cathode of the diode $D_1$ and the rail 19. The emitter of the transistor $T_2$ is connected to the rail 19 and its collector is connected to one input terminal of a bistable circuit. This bistable circuit comprises two transistors $T_3$ and $T_4$ with their collectors connected via respective resistors $R_3$ and $R_4$ and series capacitors $C_2$ and $C_3$ to the collector of the transistor $T_2$ and their emitters both connected to the rail 19. Diodes $D_2$ and $D_3$ connect the bases of the transistors $T_3$ and $T_4$ to the interconnections of the resistors $R_3$, $R_4$ with their respective capacitors $C_2$, $C_3$ and a capacitor $C_4$ is connected between the base of the transistor $T_4$ and the rail 19. The collectors of the transistors $T_3$, $T_4$ are connected by respective resistors $R_5$, $R_6$ to the rail 17 and switching feedback is provided by cross-connected resistors $R_7$, $R_8$ between the collectors of the transistors $T_3$ and $T_4$ and the bases thereof. A resistor $R_9$ is connected between the rail 17 and the collector of the transistor $T_2$.

The capacitor $C_4$ ensures that when the circuit is connected to the 12 V supply the bistable circuit initially goes into the state in which the transistor $T_3$ is on and the transistor $T_4$ is off. When the contacts 12, 13 are bridged the transistor $T_2$ starts conducting almost immediately and causes the bistable circuit to change state so that the transistor $T_4$ is then conducting.

Furthermore, the terminal 12 is also connected to a timing circuit which comprises a diode $D_4$, a resistor $R_{10}$ and a capacitor $C_5$ in series between the terminal 12 and the rail 19. The capacitor $C_5$ is bridged by a discharge resistor $R_{11}$ and the junction of the resistor $R_{10}$ and the capacitor $C_5$ is connected by a resistor $R_{12}$ to the base of a Darlington pair $T_5$, $T_6$ with its emitter connected to the rail 19 and its collector connected to the base of the transistor $T_4$.

Thus if the contacts 12, 13 are bridged for long enough to cause the transistors $T_5$, $T_6$ to switch on the bistable circuit will be reset even though the transistor $T_2$ is still on.

The output of the bistable circuit is taken from the collector of the transistor $T_4$ and is applied via a resistor $R_{13}$ to the base of an n-p-n transistor $T_7$ with its emitter connected to the rail 19 and its collector connected by a resistor $R_{14}$ to the rail 17. The collector of the transistor $T_7$ is connected to the cathode of a zener diode $D_5$ with its anode grounded to rail 19 and also to the power supply terminal pin 1 of an integrated circuit timer type SFC 606B. Pins 5 and 6 of this timer i.c. are connected to the rail 19 by capacitors $C_6$, $C_7$ respectively and are interconnected by two resistors $R_{15}$ and $R_{16}$ with a diode $D_6$ bridging the resistor $R_{15}$, and these components determining the on and off time of the signal at the output terminal, pin 10 of the device. Pins 7 and 8 are grounded and the output terminal pin 10 is connected to the collector of the transistor $T_1$.

In use, slow running is selected by bridging the contacts 12, 13 with the detent contact 15. Transistor $T_1$ then energises the relay 20. For fast running contacts 13, 14 are bridged.

For intermittent wipe mode operation the spring contact 16 is used to bridge the terminals 12, 13 briefly to set the bistable circuit and provide power to the timer i.c. by ensuring that transistor $T_7$ is switched off. The relay 20 is thus energised periodically causing the wipers to complete one cycle and then stop repeatedly. A further brief closure of the contact 16 resets the bistable circuit, switching on the transistor $T_7$ and removing operating current from the i.c. device.

For flick-wipe mode operation, the contact 16 is closed and held long enough for the transistor $T_5$, $T_6$ to switch on, e.g. about 1½ seconds. This resets the bistable circuit and prevents intermittent wipe mode operation from commencing.

I claim:

1. A windscreen wiper control circuit comprising the combination of a control switch assembly including main contacts associated with detent means for selecting normal operation and a further contact without detent means for selecting flick-wipe or intermittent operation, a pulse length recognition circuit means, operable by the further contact, for operating said wipers in the flick-wipe mode or the intermittent mode according to the length of time for which the further contact is closed.

2. A circuit as claimed in claim 1 in which said pulse length recognition circuit means is arranged such that a longer closure of the further contact is required to obtain flick-wipe mode than that required to obtain intermittent mode.

3. A circuit as claimed in claim 1 in which the control circuit includes an intermittent wipe timer which is energised by said pulse length recognition circuit means only when intermittent mode has been selected.

4. A circuit as claimed in claim 1 in which the pulse length recognition circuit means comprises a bistable circuit and a timer circuit operating to reset the bistable circuit after a predetermined interval if the further contact is still closed.

5. A road vehicle windscreen wiper system comprising the combination of a windscreen wiper mechanism, an electric motor for driving said mechanism, limit switch means for controlling parking of the wipe mechanism, a control switch assembly having main contacts associated with detent means for selecting normal wiper operation and further contacts without detent means for selecting flick-wipe or intermittent operation, a relay controlling connection of the motor to a supply, a transistor connected to drive said relay, means associated with the main contacts for turning on said transistor when normal operation is required, an intermittent wipe timer connected to said relay so as to energise the relay periodically when intermittent wipe has been selected, a bistable circuit having its output connected to the intermittent wipe timer to inhibit operation of the latter when the bistable circuit is in one state, means for biasing the bistable circuit to said one state, means operated by said further contacts for driving said bistable circuit to its other state so that said timer can start to operate and a timer circuit arranged to drive the bistable circuit back to said one state if the further contacts are maintained closed for more than a predetermined interval.

* * * * *